US010659277B2

(12) United States Patent
Petrovic

(10) Patent No.: US 10,659,277 B2
(45) Date of Patent: May 19, 2020

(54) METHOD AND SYSTEM IN WHICH A REMOTE MODULE ASSISTS IN COUNTERACTING I/Q IMBALANCE AND/OR DC OFFSET ERRORS

(71) Applicant: VIASAT, INC., Carlsbad, CA (US)

(72) Inventor: Branislav A Petrovic, Falls Church, VA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 15/753,036

(22) PCT Filed: Aug. 19, 2016

(86) PCT No.: PCT/US2016/047730
§ 371 (c)(1),
(2) Date: Feb. 15, 2018

(87) PCT Pub. No.: WO2017/034959
PCT Pub. Date: Mar. 2, 2017

(65) Prior Publication Data
US 2018/0248741 A1 Aug. 30, 2018

Related U.S. Application Data

(60) Provisional application No. 62/208,089, filed on Aug. 21, 2015.

(51) Int. Cl.
*H04L 27/36* (2006.01)
*H04L 27/38* (2006.01)
*H04B 1/40* (2015.01)

(52) U.S. Cl.
CPC ............ *H04L 27/364* (2013.01); *H04B 1/40* (2013.01); *H04L 27/3863* (2013.01)

(58) Field of Classification Search
CPC .......... H04B 1/30; H04B 1/40; H04L 25/063; H04L 27/364; H04L 27/3863
See application file for complete search history.

(56) References Cited

U.S. PATENT DOCUMENTS 8,175,549 B2   5/2012  Faust et al.
8,284,824 B1  10/2012  Smaini et al.
(Continued)

FOREIGN PATENT DOCUMENTS

| EP | 2869522 A1 | 5/2015 |
| WO | WO-2014/043600 A1 | 3/2014 |
| WO | WO-2017/034959 A1 | 3/2017 |

OTHER PUBLICATIONS

Kickliter, "DC Offset and IQ Imbalance Correction", https://github.com/Nuand/bladeRF/wiki/DC-offset-and-IQ-Imbalance-Correction, GitHub, Mar. 22, 2015, 6 pgs.
(Continued)

*Primary Examiner* — Sung S Ahn
(74) *Attorney, Agent, or Firm* — Chang & Hale LLP

(57) ABSTRACT

A transceiver comprising a transmitter and a receiver is a component of a user terminal. A transmitter-check signal is transmitted from the transceiver to a remote node. Errors in the transmitter-check signal are measured at the remote node. Transmitter-correction information based on the errors is determined within the remote node and sent back to the user terminal. The user terminal utilizes the transmitter-correction information to set a correction module in the terminal to counteract the errors within the transmitter.

27 Claims, 13 Drawing Sheets

(56) References Cited

U.S. PATENT DOCUMENTS

| | | | |
|---|---|---|---|
| 8,437,430 B2 | 5/2013 | Guo et al. | |
| 8,503,322 B2 | 8/2013 | Krishnamurthy et al. | |
| 8,798,177 B2 | 8/2014 | Park et al. | |
| 8,913,694 B2 | 12/2014 | Al-Qaq et al. | |
| 9,025,645 B2 | 5/2015 | Al-Qaq et al. | |
| 2008/0280579 A1 | 11/2008 | Cloutier et al. | |
| 2011/0207418 A1 | 8/2011 | Laroia et al. | |
| 2013/0315346 A1* | 11/2013 | Varma | H04L 7/0008 375/316 |
| 2014/0171001 A1* | 6/2014 | Fernando | H04B 17/21 455/226.1 |
| 2014/0226738 A1* | 8/2014 | Plevel | H04L 25/063 375/261 |
| 2014/0256376 A1 | 9/2014 | Weissman et al. | |
| 2014/0269863 A1 | 9/2014 | Fan et al. | |
| 2014/0313074 A1 | 10/2014 | Chang et al. | |

OTHER PUBLICATIONS

Mailand et al., "IQ-imbalance and its compensation for non-ideal analog receivers comprising frequency-selective components", www.adv-radio-sci.net/4/189/2006/, Advances in Radio Science, vol. 4, 2006, pp. 189-195.

International Search Report and Written Opinion mailed in International (PCT) Application No. PCT/US2016/047730 dated Nov. 7, 2016, 11 pgs.

International Preliminary Report on Patentability mailed in International (PCT) Application No. PCT/US2016/047730 dated Mar. 8, 2018, 8 pgs.

* cited by examiner

METHOD AND SYSTEM IN WHICH A REMOTE MODULE ASSISTS IN COUNTERACTING I/Q IMBALANCE AND/OR DC OFFSET ERRORS

BACKGROUND

Direct conversion receivers (a.k.a. homodyne or zero-IF receivers) and heterodyne receivers (a.k.a. low-IF receivers) are commonly used today to receive quadrature modulated signals sent over a communications network. The types of networks that use such receivers include satellite communication networks, wireless cellular networks, local access networks (LANs), wide access networks (WANs), as well as other types of communication networks. FIG. 1 is a simplified overview of a satellite communications network 100. The satellite communications network of FIG. 1 is an example, but it will be understood by those skilled in the art that the following discussion applies equally to other types of communication networks.

A gateway terminal (commonly referred to simply as a "gateway") 102 sends and receives signals to a satellite 104 through a satellite antenna 106. Signals transmitted from the gateway 102 to the satellite 104 are commonly referred to as forward uplink signals 108. Signals that are received by the gateway 102 from the satellite 104 are commonly referred to as return downlink signals 110.

The satellite 104 receives the forward uplink signals 108 sent from the gateway 102 and retransmits them to one or more user terminals 112 within the satellite communications network 100. Signals transmitted from the satellite to a user terminal 112 are commonly referred to as forward downlink signals 118. Signals received by the satellite from the user terminal 112 are commonly referred to as return uplink signals 120. Two user terminals 112 are shown. However, a typical satellite communications network 100 comprises many such user terminals. The user terminals 112 may be either fixed in their location or mobile terminals. Each user terminal 112 may have an antenna 122 and may comprise multiple elements including, for example, an outdoor unit (not shown), an indoor unit (not shown), and a link (not shown) there between.

In some cases, the gateway 102 communicates over a "backhaul" 116 with a terrestrial communications network 114, such as the Internet to allow the satellite 104 to connect a user terminal 112 to the terrestrial communications network 114.

FIG. 2 is a schematic of a portion of a direct conversion receiver, such as might be found in a user terminal 112 shown in FIG. 1. (As noted, a user terminal 112 can alternatively have a heterodyne receiver.) A composite quadrature receive signal 202 is applied to the data input of both an I-mixer 204 and a Q-mixer 206. A receiver local oscillator (LO) 208 is coupled to a phase splitter 210 that has an I-output that is at a reference phase (commonly referred to as 0 degrees) and a Q-output at the same frequency, but shifted 90 degrees with respect to the I-output. The I-output is coupled to the LO input of the I-mixer 204. The Q-output is coupled to the LO input of the Q-mixer 206. The outputs 212, 214 of the mixers 204, 206 are then digitized in analog-to-digital converters (ADC) 216, 218.

One problem that occurs with direct conversion receivers and to a certain extent with heterodyne receivers is that there can be an imbalance between the in-phase leg and the quadrature leg of either the transmitter from which the quadrature modulated signal is sent or the receiver that receives the signal. For example, imbalances in the amplitude or the phase of the in-phase signal 212 output by the I-mixer and quadrature signal 214 output by the Q-mixer can make it difficult to discriminate between symbols. That is, symbols are distinguished from one another based on the relative amplitude of the in-phase component 212 and the quadrature component 214 of the received signal 202. Therefore, differences in the gain and phase of the LOs or the path through the ADCs 216, 218 can lead to errors in identifying the symbol represented by the combination of in-phase and quadrature components of the received signal. Additionally, differences in the mixers 204, 206 and inaccuracy of the 90 degree phase splitter 210 can all result in an I/Q imbalance error. In addition, due to several causes that are well known in the art, it is possible for the output of the mixers 204, 206 to have a direct current (DC) offset. Such a DC offset can cause, among other problems, the ADCs 216, 218 to saturate prematurely.

SUMMARY

A transceiver comprising a transmitter and a receiver is a component of a user terminal. In some embodiments of the disclosed method and apparatus, a transmitter-check signal is transmitted from a transceiver within a user terminal to a remote node. Transmitter-correction information is determined within the remote node based on the received transmitter-check signal. The transmitter-correction information is sent back to the user terminal. The user terminal then utilizes the transmitter-correction information to counteract I/Q imbalance and/or DC offset errors within the transmitter. In some embodiments, measurements of errors in the transmitter-check signal are made at the remote node and included within the transmitter-correction information. The measurements are then used by the user terminal to calculate transmitter-correction parameters. Alternatively, transmitter-correction parameters are calculated at the remote node. In this case, the transmitter-correction information transmitted to the user terminal from the remote node comprises the transmitter-correction parameters. In either case, the transmitter-correction parameters are used by the user terminal to set a transmitter-correction module in the transmitter to counteract at least one of the I/Q imbalance error and/or the DC offset error detected in the transmitter-check signal.

In some embodiments, the transmitter-check signal comprises payload data. Alternatively, the transmitter-check signal comprises a test signal that makes it easier for the remote node to measure the I/Q imbalance error and the DC offset error in the transmitter-check signal. In some such embodiments, the transmitter-check signal is sent during a test period. Payload data is sent during a payload period. In some cases in which the transmitter-check signal is sent during a test period and comprises a test signal, the transmitter-check signal also comprises payload data. However, during payload periods, only payload data is transmitted from the user terminal to the remote node. In cases in which the transmitter-check signal is sent during a test period, scheduling information is used to distinguish test periods from payload periods. In some cases, the scheduling information is generated in the remote node and transmitted to the user terminal. Alternatively, the scheduling information is generated in the user terminal and sent to the remote node.

In addition to counteracting errors in the transmitter of the user terminal, in some embodiments, errors in a receiver of the user terminal are also counteracted. A receiver-check signal is transmitted by the remote node to the user terminal. The user terminal measures errors (such as I/Q imbalance and/or DC offset errors) in the receiver-check signal and generates receiver-error data. The receiver-error data is transmitted back to the remote node, and the remote node uses the receiver-error data to calculate receiver-correction parameters. Alternatively, the receiver-correction parameters can be calculated at the user terminal from the receiver-error data, foregoing any need for sending the receiver-error data to the remote node. Regardless, the receiver-correction parameters are used by the user terminal to set a transmitter-correction module in the transmitter to counteract at least one of the I/Q imbalance error and the DC offset error detected in the receiver-check signal. A receiver-check signal may comprise both test signals and payload signals, or alternatively, just test signals. In addition, a receiver-check signal may be transmitted during test periods and payload data may be transmitted during payload periods. The test and payload periods for the receiver may occur at different times from the test and payload periods for the transmitter.

BRIEF DESCRIPTION OF THE FIGURES

The drawings are provided for purposes of illustration only and merely depict examples of some embodiments. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

Reference numbers are used herein to refer to aspects of the drawings. Similar or like aspects are typically shown using like reference numbers. A group of similar or like elements may be referred to collectively by a single reference number (e.g., 200), while individual elements of the group may be referred to by the reference number with an appended letter (e.g., 200*a*, 200*b*).

The figures are not intended to be exhaustive or to limit the claimed invention to the precise form disclosed. It should be understood that the disclosed method and apparatus may be practiced with modification and alteration, and that the invention should be limited only by the claims and the equivalents thereof.

DETAILED DESCRIPTION

Figure 3:
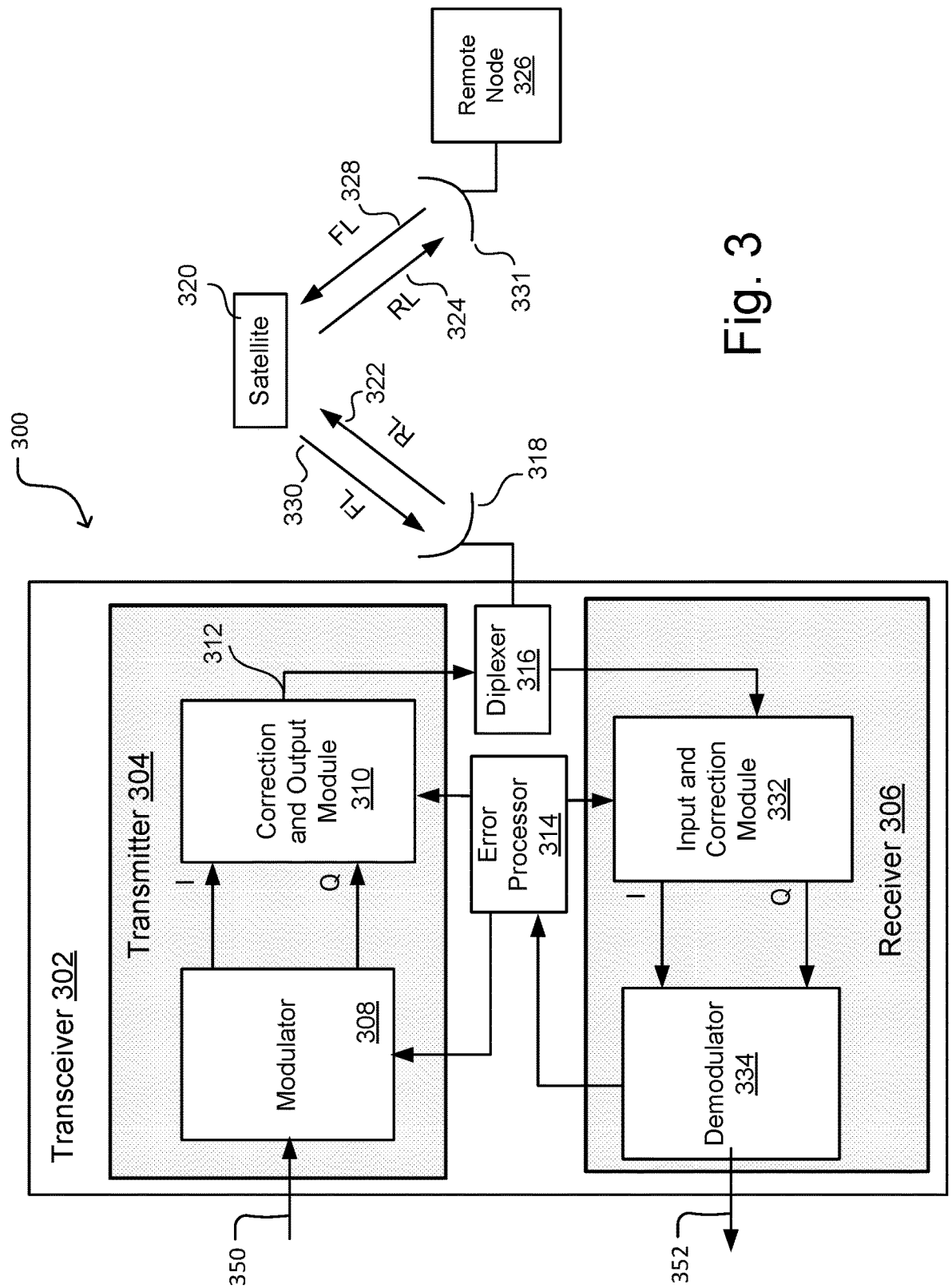
FIG. 3 includes a high-level schematic of selected components of a user terminal in accordance with disclosed embodiments.

Several embodiments of a user terminal and a gateway terminal (commonly referred to simply as a "gateway") in accordance with the disclosed method and apparatus are discussed herein. FIG. 3 is a high-level schematic of an embodiment of some of the elements of a user terminal in accordance with disclosed embodiments.

Figure 1:
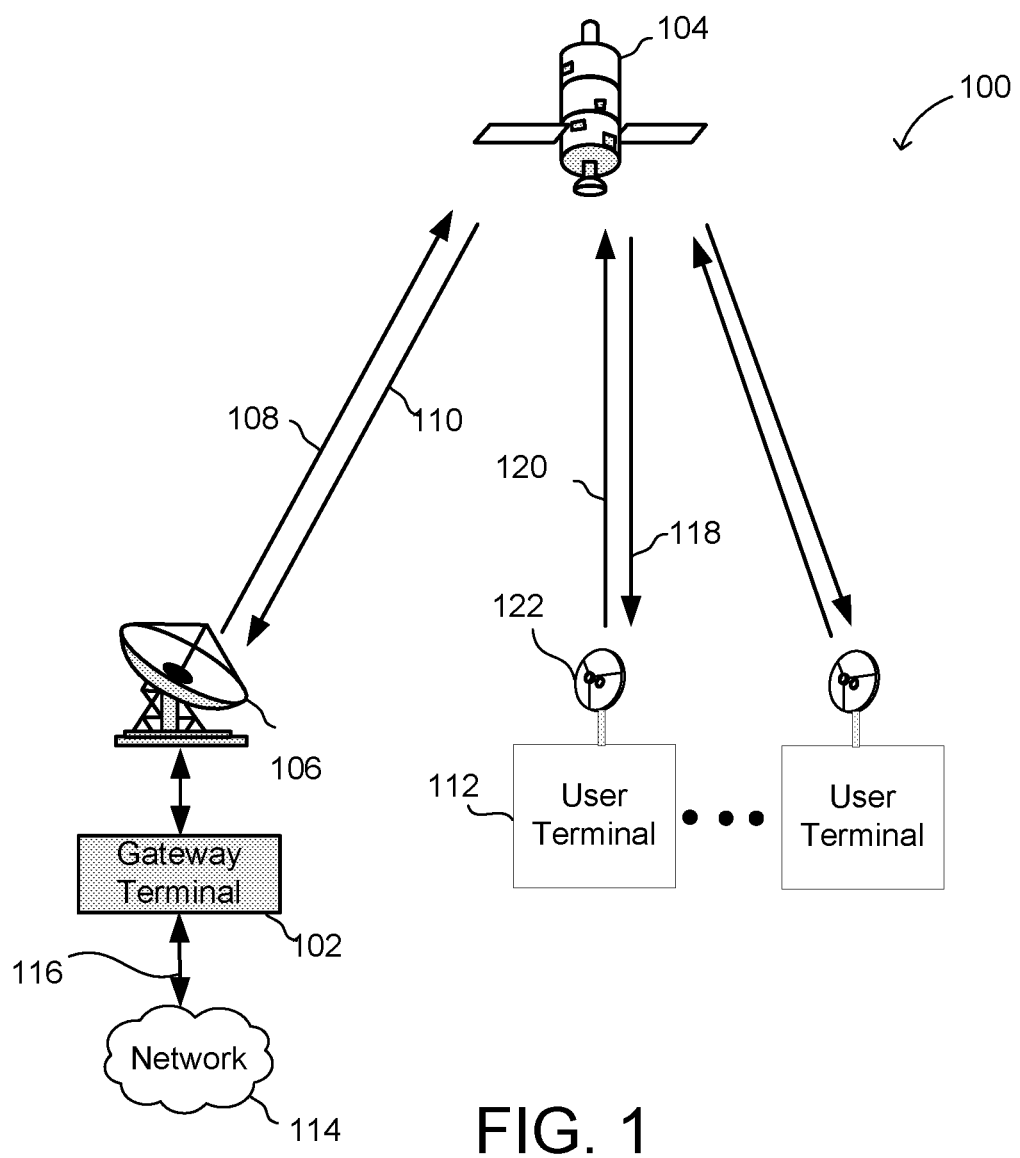
FIG. 1 is a simplified overview of a satellite communications network.
Figure 2:
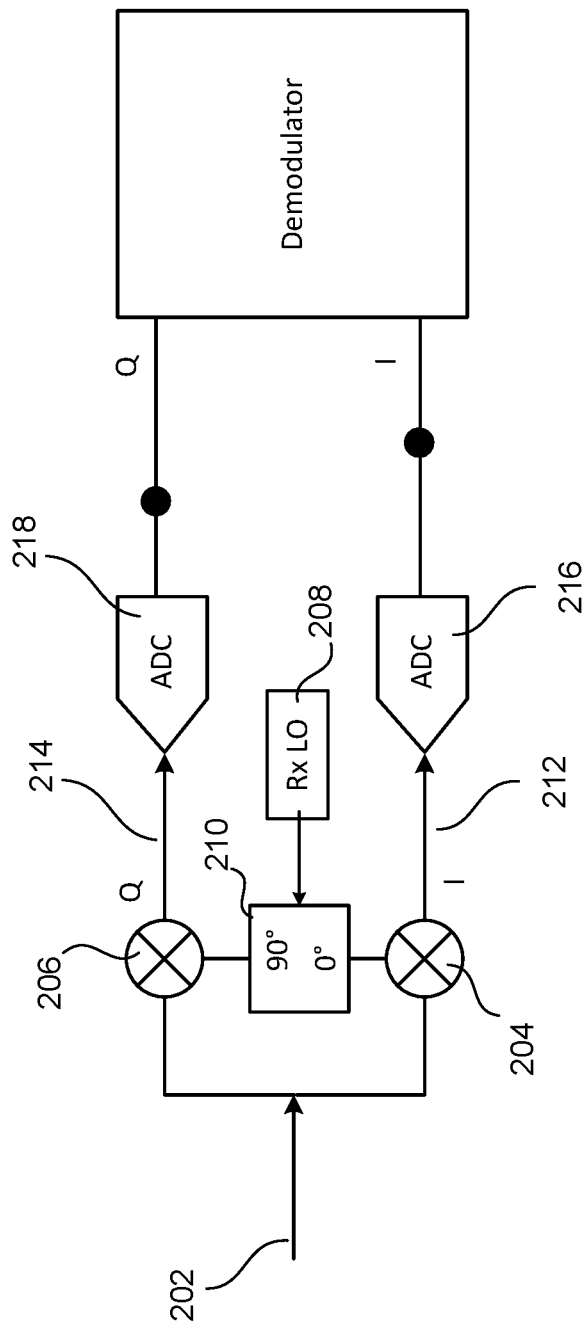
FIG. 2 is a schematic of a portion of a direct conversion receiver, such as might be found in a user terminal shown in FIG. 1.

FIG. 3 illustrates examples of a transceiver 302 comprising a transmitter 304 and a receiver 306, which can be components of a user terminal 300. The user terminal 300 (which is shown in FIG. 3 in part) can be part of a communications system such as the satellite communications system 100 shown in FIG. 1. As will become clear from the following discussion of FIGS. 3 and 4 and the flowcharts shown in FIGS. 5, 7, 8 and 9, a remote node 326 can assist in setting a correction and output module 310 in the transmitter 304 to counteract I/Q imbalance and/or DC offset errors in signals transmitted by the transmitter 304. A transmitter-check signal is transmitted from a transceiver 302 within the user terminal 300 to the remote node 326. Transmitter-correction information is determined within the remote node 326 based on the received transmitter-check signal. The transmitter-correction information is then sent back to the user terminal 300. The user terminal 300 utilizes the transmitter-correction information to set the correction and output module 310 in the transmitter 304 to counteract the I/Q imbalance and/or DC offset errors detected in the transmitter-check signal. Utilizing computing power in a remote node 326 can advantageously reduce the cost, size, and complexity of a user terminal 300.

The following is a more detailed discussion of a method and apparatus for setting the correction and output module 310 in the transmitter 304 to counteract I/Q imbalance and DC offset errors using measurements made at the remote node 326. In normal operation, the transmitter 304 receives data 350, which is coupled to a modulator 308 within the transmitter 304. The modulator 308 converts the received data into modulation symbols. Each modulation symbol has an in-phase component (I-component) and a quadrature component (Q-component). The I and Q components of the modulation symbols are coupled to a correction and output module 310. In one embodiment of the disclosed method and apparatus, the correction and output module 310 performs a direct conversion to RF of the symbols provided by the modulator 308. In addition, what are termed herein "transmitter-correction parameters" can be applied to the correction and output module 310, setting it to counteract I/Q imbalance and DC offset errors in the transmitter 304. In one embodiment, the transmitter-correction parameters are coupled to the correction and output module 310 from an error processor 314. Operation of the error processor 314 and the correction and output module 310 are discussed in detail below.

To set the correction and output module 310 to counteract I/Q imbalance and/or DC offset errors, the correction and output module 310 generates a quadrature modulated transmitter-check signal that is output on a signal line 312 to a diplexer 316. The diplexer couples the transmitter-check signal to an antenna 318 for transmission to a satellite 320 over a return uplink 322. The satellite 320 retransmits the transmitter-check signal over a return downlink 324 to a remote node 326, such as a gateway.

The transmitter-check signal can be a test signal generated for setting the correction and output module 310. Examples of such a test signal include a single tone in a sideband of a carrier signal and a carrier signal carrying a known test pattern of symbols. Alternatively, modulated information signals carrying payload data can be utilized to set the correction and output module 310. In such a case, the transmitter-check signal comprises payload signals transmitted by the transmitter 304.

It is noted that the system illustrated in FIG. 3 is but an example. Examples of variations include that the transceiver 302 can comprise a separate antenna 318 for each of the transmitter 304 and receiver 306. As another example, the communications link between the user terminal 300 and the remote node 326 need not include a satellite 320.

Figure 4:
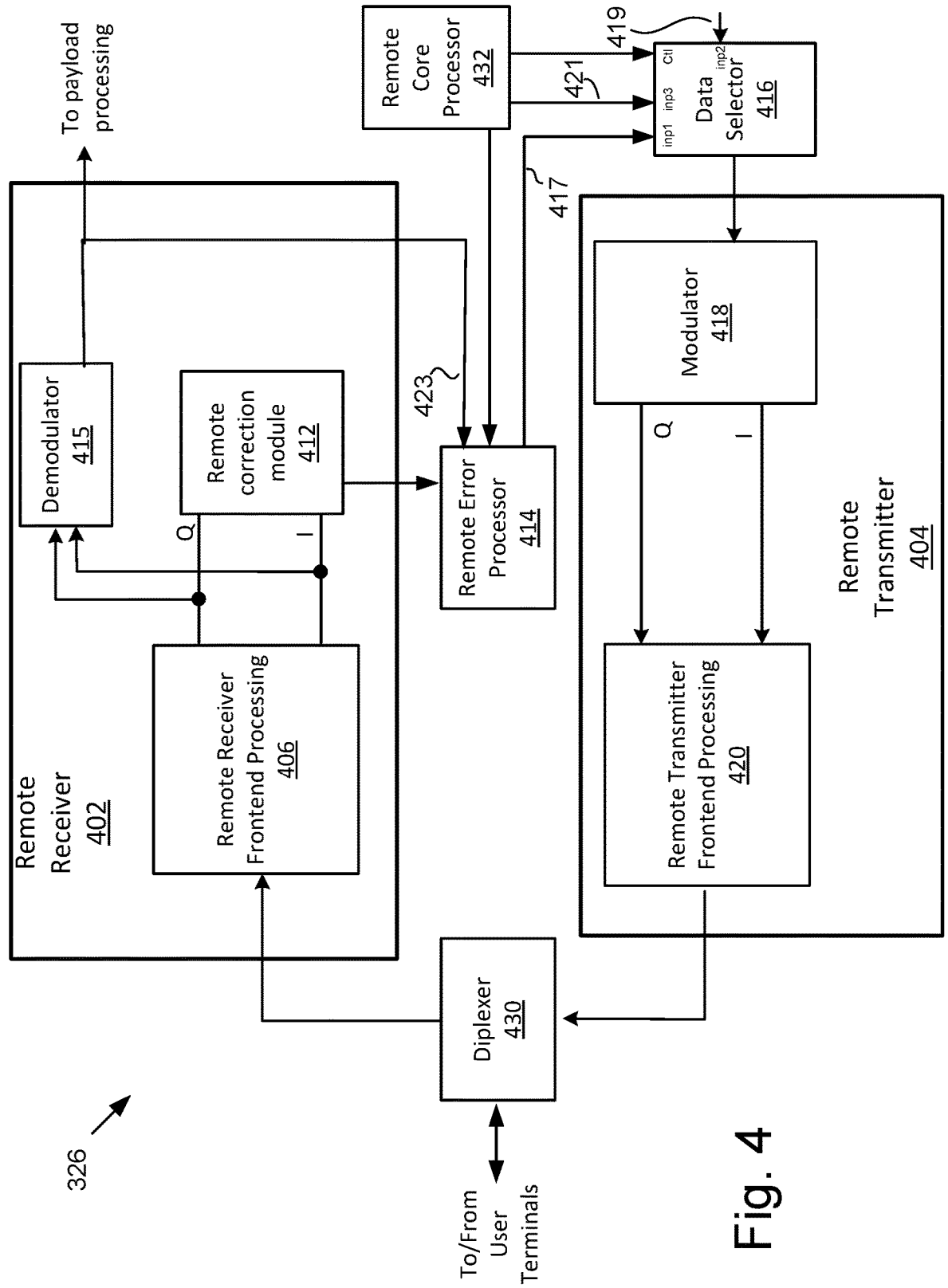
FIG. 4 includes a simplified illustration of a remote node in accordance with disclosed embodiments.

FIG. 4 is a simplified illustration of an embodiment of the remote node 326. The remote node 326 comprises a remote receiver 402 and a remote transmitter 404. Signals received at the remote node 326 from the satellite 320 are processed by remote frontend receiver processing 406 to produce I and Q components, which are coupled a remote correction module 412 and a demodulator 415. The demodulator 415 is discussed further below.

The remote correction module 412 receives the transmitter-check signal and measures an I/Q imbalance error and/or a DC offset error in the transmitter-check signal. As used herein, "transmitter-error data" is a refers to the I/Q imbalance and/or DC offset errors measured by the remote node 326 or to error data that corresponds to or is otherwise derived from the I/Q imbalance and/or DC offset errors. Regardless, several methods for measuring an I/Q imbalance error and/or a DC offset error in a signal such as the transmitter-check signal are well known to those skilled in the art.

For example, if the transmitter-check signal comprises a single tone in a sideband of a carrier signal, an I/Q imbalance error corresponds to energy detected in an opposite side band. Moreover, the DC energy should be zero, and a DC offset error thus corresponds to any detected DC amount.

As another example, assuming that the remote node 326 has knowledge of the modulation symbols that were modulated on the transmitter-check signal (e.g., the transmitter-check signal comprises a known test pattern of symbols), the remote correction module 412 can measure the I/Q imbalance error by correlating the I and Q components of the transmitter-check signal, which should be zero. The correlation value is thus a measurement of the I/Q imbalance error.

Assuming the test pattern is selected so that the I/Q values of the symbols average to zero, the average I/Q value of the symbols corresponds to the DC offset error.

As yet another example, if the transmitter-check signal comprises payload signals, information can be gathered over a period of time, during which the remote node 326 is receiving and attempting to demodulate symbols transmitted to the remote node 326 from the user terminal. The information gathered can be used to measure the error. An I/Q imbalance error can correspond to an average correlation value of the I and Q components of the symbols, and a DC offset error can correspond to an average I/Q value of the symbols, which over many symbols should average to zero absent a DC offset error.

Transmitter-correction information based on the I/Q imbalance and/or DC offset errors measured by the remote correction module 412 are sent back to the user terminal 300. In one embodiment, the transmitter-correction information comprises transmitter-correction parameters to be applied to the correction and output module 310 in the user terminal 300. In such an embodiment, the remote correction module 412 provides the measured I/Q imbalance and/or DC offset errors to a remote error processor 414, which calculates the transmitter-correction parameters from the measured I/Q imbalance and/or DC offset errors. In another embodiment, the transmitter-correction information comprises transmitter-error data (e.g., the measured I/Q imbalance and/or DC offset errors measured by the remote correction module 412). The transmitter-error data is transmitted back to the receiver 306 in the user terminal 300 (see FIG. 3), where the error processor 314 calculates transmitter-correction parameters from the transmitter-error data.

Regardless of whether the transmitter-correction parameters are calculated in the remote node 326 by the remote error processor 414 or in the user terminal 300 by the error processor 314, the transmitter-correction parameters can be calculated in any of many well known ways for calculating parameters for counteracting I/Q imbalance and/or DC offset errors. For example, parameters for counteracting DC offset errors include phasors that are the inverse of the measured DC offset errors. The correction and output module 310 can predistort signals in the transmitter 304 with the inverse phasor. As another example, parameters for counteracting I/Q imbalance errors can comprise weights for coefficients of an equalizer (not shown) in the correction and output module 310 for predistorting signals in the transmitter 304 to counteract the I/Q imbalance and/or DC offset errors in the transmitter 304.

Regardless of whether the transmitter-correction information comprises transmitter-correction parameters calculated by the remote error processor 412 or transmitter-error data that the error processor 314 in the user terminal 300 will use to calculate transmitter-correction parameters, the transmitter-correction information is sent from the remote node 326 to the user terminal 300. For example, the transmitter-correction information is coupled to a data input (inp1) of a data selector 416 over a signal line 417. In some cases, the data selector 416 is capable of combining the transmitter-correction information with payload data coupled to a data input (inp2) of the data selector 416 on a signal line 419. By combining the data, both transmitter-correction information and payload data can be transmitted concurrently. Alternatively, the data selector 416 selects between: (1) the payload data intended for user terminals with which the remote node 326 is communicating; and (2) the transmitter-correction information.

The output of the data selector 416 is coupled to a modulator 418 within the remote transmitter 404. The modulator 418 modulates the output of the data selector 416 for transmission by the remote node 326 to user terminals. Remote transmitter frontend processing 420 in the remote transmitter 404 provides the output of the modulator 418 to a diplexer 430 and an antenna 331 (shown in FIG. 3) for transmission over a forward uplink 328 to a satellite 320. The satellite 320 retransmits the received signal to user terminals over a forward downlink 330.

It is noted that, during normal operation in which the remote node 326 is receiving payload signals, the demodulator 415 demodulates the payload signals into symbols, which are provided to payload processing modules (not shown) in the remote node.

Looking once again at FIG. 3, the signal received by a user terminal 300 over the forward downlink 330 is coupled from the user terminal antenna 318 to the diplexer 316. The output of the diplexer 316 is coupled to the input and correction module 332 within the receiver 306. The input and correction module 332 outputs an I-component and a Q-component of the received signal to a demodulator 334. The demodulator 334 provides symbols of demodulated payload data 352 to other modules (not shown) in the remote node 300 for further processing. When the demodulated data comprises transmitter-correction information, however, the demodulator 334 also couples demodulated data to the error processor 314. In embodiments in which the transmitter-correction information comprises transmitter-error data (e.g., the I/Q imbalance error and/or DC offset error measurements taken by the remote correction module 412), the error processor 314 calculates the transmitter-correction parameters at the user terminal 300 and couples the calculated transmitter-correction parameters to the correction and output module 310 thus setting it to counteract I/Q imbalance and/or DC offset errors in the transmitter 304. The error processor 314 can calculate transmitter-correction parameters in any manner discussed above with respect to the remote error processor 414. In embodiments in which the transmitter-correction information comprises transmitter-correction parameters calculated by the remote error processor 414 as discussed above, the error processor 314 can simply couple the transmitter-correction parameters to the correction and output module 310.

Figure 5:
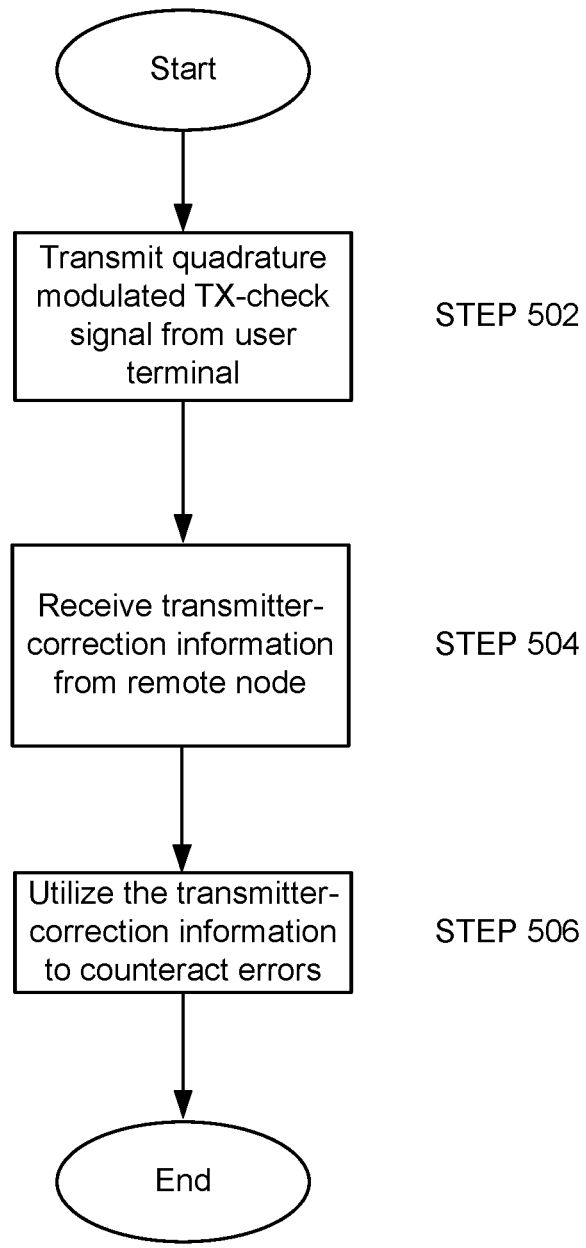
FIG. 5 is a flowchart of a method performed by a user terminal for setting the correction and output module of FIG. 4 to counteract I/Q imbalance and/or DC offset errors in the transmitter.

FIG. 5 is a flowchart of a method performed by a user terminal 300 for setting the correction and output module 310 to counteract I/Q imbalance and/or DC offset errors in the transmitter 304. As noted above, a quadrature modulated transmitter-check signal is transmitted from the user terminal over a communications network to a remote node (STEP 502). The user terminal then receives transmitter-correction information corresponding to I/Q imbalance and/or DC offset errors measured, in the transmitter-check signal, at the remote node (STEP 504). The transmitter-correction information is then utilized to set the correction and output module 310 to counteract the errors (STEP 506). As noted above, in some embodiments, the transmitter-correction information comprises transmitter-correction parameters that can be applied to the correction and output module 310 shown in FIG. 3. In other embodiments, the transmitter-correction information comprises transmitter-error data (e.g., the I/Q imbalance error and/or the DC offset error measured by the remote node) from which the user terminal 300 can calculate the transmitter-correction parameters. In such embodiments, utilizing the transmitter correction information comprises calculating the transmitter-correction parameters within the error processor 314 of the user terminal, and then applying the transmitter-correction parameters to the correction and output module 310.

Figure 6:
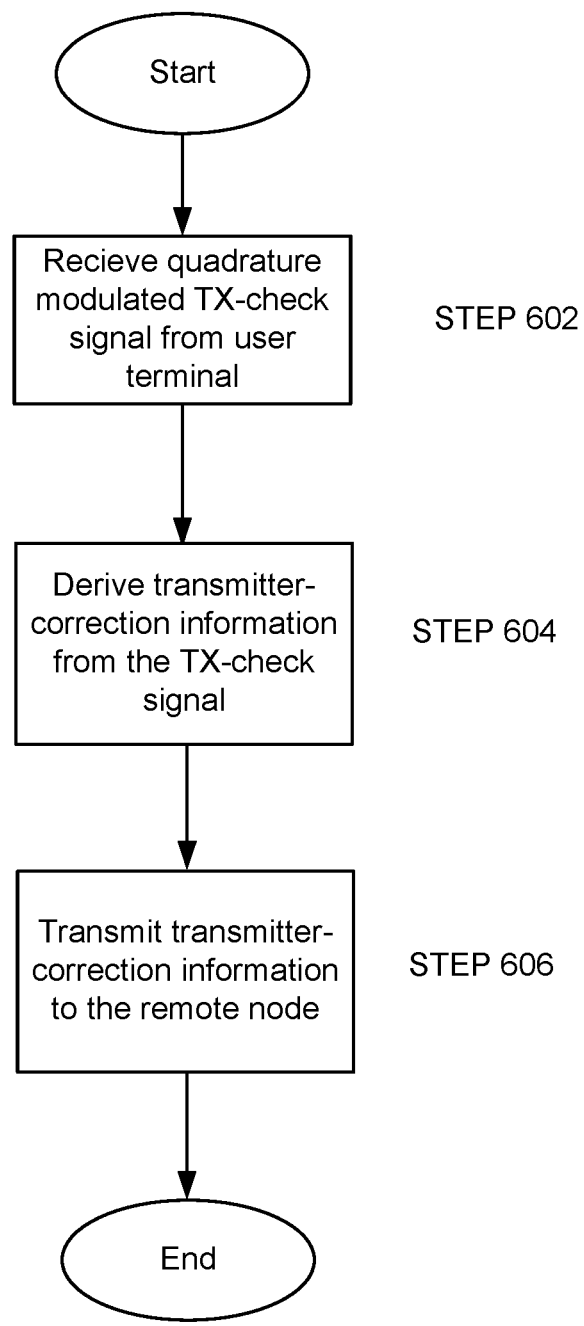
FIG. 6 is a flowchart of a method performed by a remote node to assist in the method shown in FIG. 5.

FIG. 6 is a flowchart of a method performed by the remote node 326 to assist the user terminal 300 in setting the correction and output module 310 to counteract I/Q imbalance and/or DC offset errors in the transmitter 304. The remote node 326 receives the quadrature modulated transmitter-check signal transmitted by the user terminal at STEP 502 of FIG. 5 (STEP 602 in FIG. 6). In some embodiments, the transmitter-check signal may be transmitted by the user terminal 300 through a satellite 320 to the remote node 326. In some such embodiments, the remote node 326 is a gateway. The remote node 326 then derives transmitter-correction information from the received transmitter-check signal (STEP 604). As noted above, in some embodiments, the transmitter-correction information comprises transmitter-correction parameters that, when applied to the correction and output module 310 in the user terminal 300, set the correction and output module 310 to counteract the I/Q imbalance and/or DC offset errors detected in the transmitter-check signal. In such embodiments, the remote node 326 measures I/Q imbalance and/or DC offset errors in the received transmitter-check signal and calculates the transmitter-correction parameters therefrom. In other embodiments, the transmitter-correction information comprises transmitter-error data from which the error processor 314 in the user terminal 300 will calculate the transmitter-correction parameters. In such an embodiment, the remote node 326 measures I/Q imbalance and/or DC offset errors in the received transmitter-check signal. The transmitter-error data is or corresponds to the measured I/Q imbalance and/or DC offset errors. Regardless, the remote node 326 then sends the transmitter-correction information to the user terminal 300 (STEP 606), which is received at the user terminal 300 at STEP 504 of FIG. 5.

I/Q imbalance and/or DC offset errors can also be counteracted within the receiver 306 of the user terminal 300. Briefly stated, in one embodiment, the remote node 326 transmits a receiver-check signal to the user terminal 300. The user terminal measures I/Q imbalance and/or DC offset errors in the receiver-check signal and sends the measurements back to the remote node 326. The remote node 326 then calculates receiver-correction parameters from the measurements and sends the parameters back to the user terminal 300, which applies the parameters to the input and correction module 332 to be utilized to counteract the I/Q imbalance and/or DC offset errors detected in the receiver-check signal. In another embodiment, the remote node 326 transmits a receiver-check signal to the user terminal 300, and the user terminal 300 measures I/Q imbalance and/or DC offset errors in the receiver-check signal as in the above-discussed embodiment. But in this embodiment the user terminal 300 calculates the receiver-correction parameters from the measurements and then applies the parameters to the input and correction module 332.

The following is a more detailed discussion of a method and apparatus for setting the input and correction module 332 in the receiver 306 to counteract I/Q imbalance and DC offset errors with assistance from the remote node 326. The remote node 326 (see FIG. 3) transmits a receiver-check signal to the satellite 320 over a forward uplink 328. The receiver-check signal is retransmitted by the satellite 320 to the transceiver 302 within the user terminal 300 over a forward downlink 330. The diplexer 316 within the transceiver 302 couples the receiver-check signal to an input and correction module 332 of the receiver 306. The input and correction module 332 downconverts the receiver-check signal and outputs an I-component and a Q-component. In addition, the input and correction module 332 can measure I/Q imbalance and/or the DC offset errors in the receiver-check signal. Suitable examples of the receiver-check signal include all of the examples of the transmitter-check signal discussed above including a test signal comprising a single tone in a sideband of a carrier signal, a carrier signal carrying a known test pattern of symbols, or a payload signal as generally discussed above with respect to the transmitter-check signal. Examples of measuring I/Q imbalance error and DC offset error in the receiver-check signal include all of the examples discussed above with respect to measuring similar errors in the transmitter-check signal.

The input and correction module 332 couples the measurements to the error processor 314. In some embodiments, the error processor 314 directly calculates receiver-correction parameters and then applies the parameters to the input and correction module 332. This sets the input and correction module 332 to counteract the I/Q imbalance error and/or the DC offset error in the receiver 306.

In other embodiments, the error processor 314 couples the measurements to the modulator 308 for transmission to the remote node 326 by the transmitter 304. In some embodiments, a switch (not shown) within the modulator 308 selects between the measurements and a transmitter-check signal and/or payload signals to allow the measurements to be time multiplexed into the transmitter's output. Alternatively, a multiplexer (not shown) within the modulator 308 selects an alternate frequency or channel (such as a code channel, etc.) over which to transmit modulated measurements to the remote node 326.

The modulated measurements output from the modulator 308 are coupled to the correction and output module 310. The correction and output module 310 upconverts and combines the I and Q components to generate an RF output. The RF output of the correction and output module 310 is coupled to the diplexer 316 to be transmitted over the antenna 318 to the satellite 320. The satellite 320 retransmits RF output comprising the modulated measurements to the antenna 331 of the remote node 326.

Looking once again at FIG. 4, the diplexer 430 receives the signal comprising the modulated measurements. Remote receiver frontend processing 406 then provides a digital output to the demodulator 415. The demodulator 415 demodulates the measurements and provides the demodulated measurements to the remote error processor 414 over a signal line 423. The remote error processor 414 calculates the receiver-correction parameters from the measurements. The receiver-correction parameters can be calculated in any manner discussed above for calculating the transmitter-correction parameters. The receiver-correction parameters are then sent back to the user terminal 300. For example, the receiver-correction parameters are coupled to the data input (inp1) of the data selector 416. The data selector 416 couples the receiver-correction parameters to the modulator 418 to be modulated for transmission to the user terminal 300. The output of the modulator 418 is coupled to remote transmitter frontend processing 420, which generates an RF signal for transmission to the satellite 320. The satellite 320 retransmits the RF signal to the antenna 318 of the user terminal 300. The RF signal is routed through the diplexer 316 to the input and correction module 332. The down-converted output of the input and correction module 332 is coupled to the demodulator 334, which demodulates the receiver-correction parameters and couples the parameters to the error processor 314. The error processor 314 then couples the parameters to the input and correction module 332, which sets input and correction module 332 to counteract in the receiver 306 the I/Q imbalance and/or DC offset errors measured in the receiver-check signal.

Returning to discussing setting the transmitter 304, as noted above, in some embodiments of the disclosed method and apparatus, the transmitter-check signal that is output on the signal line 312 from the correction and output module 310 comprises payload data modulated onto a carrier signal. For the purposes of this discussion, payload data includes information that has a terrestrial communications network 114 (see FIG. 1) as its destination. Alternatively, the transmitter-check signal comprises a test signal, which can comprise test data modulated onto a carrier signal for the purpose of making it easier to measure characteristics of the transmitter-check signal, including an I/Q imbalance error, a DC offset error, or both.

In some cases, the transmitter-check signal comprises both test data and payload data. The transmitter-check signal is continuously transmitted. In other cases, the transmitter-check signal comprising the test signal is transmitted only during a test period. A payload signal comprising payload data is transmitted during a payload period. In some cases, the transmitter-check signal may comprise both a test signal and payload data during a test period, but comprises only payload data during a payload period.

Figure 7:
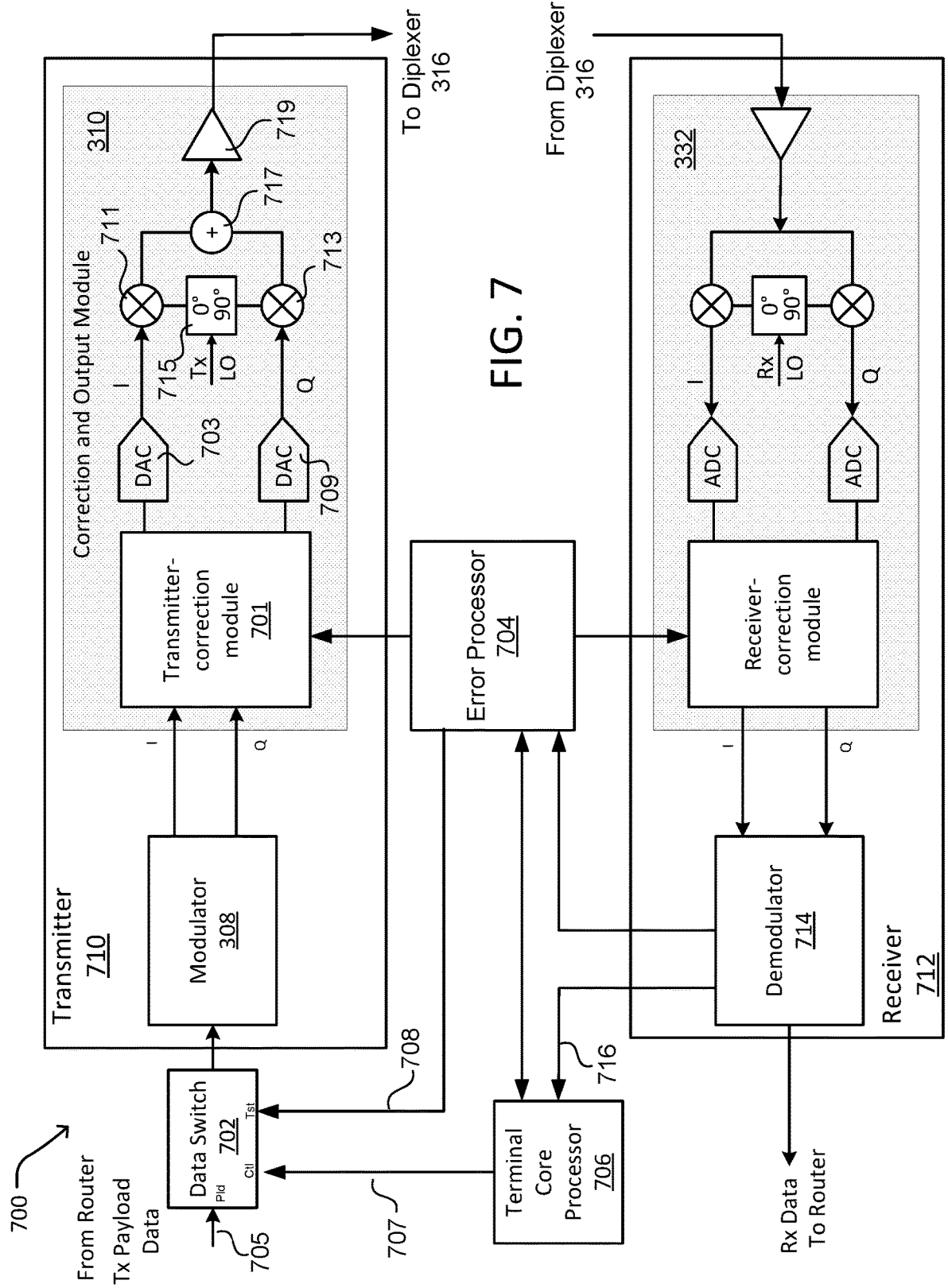
FIG. 7 is an illustration of selected components of a user terminal capable of transmitting a transmitter-check signal that comprises a test signal during test periods that are distinct from payload periods.

FIG. 7 is an illustration of selected components of an embodiment of a user terminal 700 capable of transmitting a transmitter-check signal that comprises a test signal during test periods that are distinct from payload periods. (The user terminal 700 can comprise other components not shown in FIG. 7.) The operation of the user terminal 700 of FIG. 7 is essentially the same as that of the user terminal 300 shown in FIG. 3. However, a transmit data switch 702 is provided to select between payload data and test data. Furthermore, additional details of an embodiment of the correction and output module 310 are shown in FIG. 7 and discussed further below.

Looking at FIG. 7, the transmit data switch 702 has a payload input (Pld), a test data input (Tst), and a control input (Ctl). The payload input (Pld) is coupled by a signal line 705 to a source, such as a router (not shown) that is part of or connected to the user terminal 700. The test data input (Tst) is coupled by a signal line 708 to an error processor 704. The control input (Ctl) is coupled by a control line 707 to a terminal core processor 706. In some embodiments, during test periods, the terminal core processor 706 applies signals over the control line 707 to control the transmit data switch 702 to output the data presented at the test input (Tst). Accordingly, the terminal core processor 706 controls the transmit data switch 702 to couple test data to the transmitter 710 during the test period. During payload periods, the terminal core processor 706 applies control signals to the transmit data switch 702 that cause the transmit data switch 702 to couple the payload data at the payload input (Pld) to the transmitter 710. Accordingly, the terminal core processor 706 controls the transmit data switch 702 to selectively transmit a quadrature modulated transmitter-check signal during test periods and to transmit a payload signal during payload periods.

In some embodiments, a remote core processor 432 (see FIG. 4) within the remote node 326 is responsible for scheduling test periods and payload periods. The remote core processor 432 generates scheduling information and couples the scheduling information to a data input (inp3) of the data selector 416 over a signal line 421. The scheduling information is modulated by the modulator 418 in the remote transmitter 404 and communicated from the remote node 326 to the user terminal 700 (see FIG. 7) over the satellite (i.e., the forward uplink 328, the satellite 320, and the forward downlink 330). The RF signal on which the scheduling information is modulated is received by the user terminal 700 and coupled from the diplexer 316 (see FIG. 3) within the user terminal 700 to the receiver 712. After any initial processing by the input and correction module 332, the RF signal is provided to the demodulator 714 within the receiver 712, which demodulates the scheduling information and couples the scheduling information to the terminal core processor 706 over a signal line 716. The terminal core processor 706 uses the scheduling information to determine whether the transmit data switch 702 outputs test data or payload data.

In another case, based on the scheduling information, the terminal core processor 706 controls the transmit data switch 702 to multiplex payload data with test data during test periods. Accordingly, the terminal core processor 706 controls the transmit data switch 702 to cause the user terminal 700 to selectively transmit a transmitter-check signal comprising both payload data and test data during test periods. The terminal core processor 706 further controls the transmit data switch 702 to cause the user terminal 700 to selectively transmit a payload signal comprising only payload data during payload periods.

The output of the transmit data switch 702 is coupled to the modulator 308. I and Q components corresponding to modulation symbols that represent the input applied to the modulator 308 are output from the modulator 308 to the correction and output module 310.

In some embodiments, the correction and output module 310 comprises a transmitter-correction module 701. The I and Q outputs of the modulator 308 are coupled respectively to an I and Q input of the transmitter-correction module 701. In accordance with one embodiment of the disclosed method and apparatus, the transmission-correction module 701 comprises a digital signal processor (not shown) that sums the transmitter-correction parameters with values associated with the I and Q components output from the modulator 308 to counteract the I/Q imbalance error and/or the DC offset error in the transmitter 710. In some cases, the value required to counteract the errors in the I and Q components is a constant. However, in some cases, the value of the parameter to be summed with the I and Q components will vary over time or depend upon the value of the I and Q component. As noted above, calculation of the value required to counteract the error is well known in the art.

I and Q components output from the transmitter-correction module 701 are coupled to an I DAC 703 and a Q DAC 709. The DACs 703, 709 convert the digital output of the transmitter-correction module 701 into analog signals that are then up-converted to RF in mixers 711, 713. A 90 degree splitter 715 provides an I-LO and Q-LO (where LO means "local oscillator") to the mixers 711, 713. The outputs of the mixers 711, 713 are then summed in a combiner 717. The output of the combiner 717 is coupled to the input of a power amplifier 719.

Figure 8:
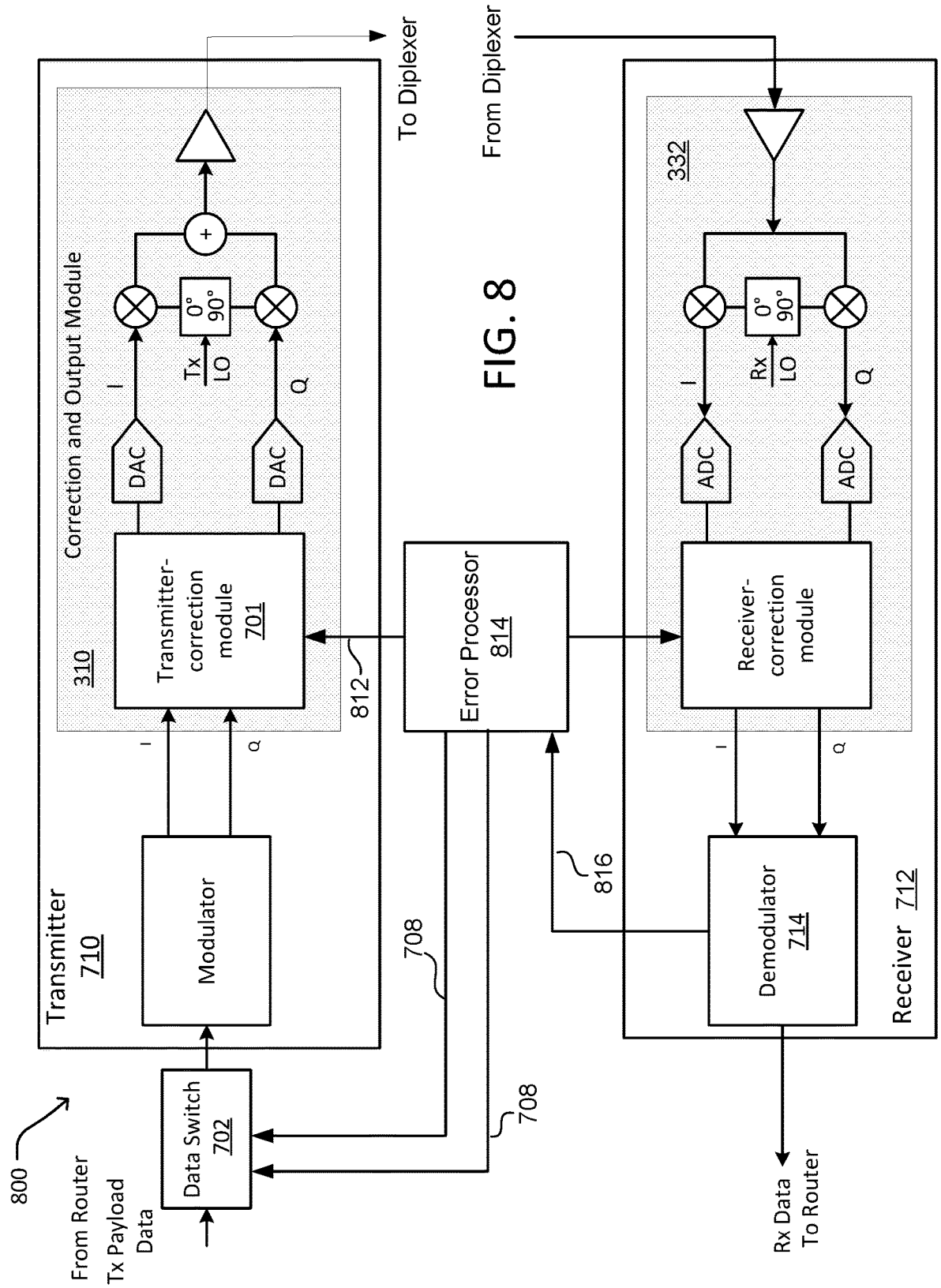
FIG. 8 is an illustration of an alternative embodiment of a user terminal in which an error processor receives scheduling information.

FIG. 8 illustrates an alternative embodiment of a user terminal 800 in which the error processor 814 (which can be similar to error processor 704) receives the scheduling information from the demodulator 714 in the receiver 712 over a signal line 816. (The user terminal 800 can comprise other components not shown in FIG. 8.) Based on the scheduling information, the error processor 814 controls the transmit data switch 702 to couple payload data to the transmitter 710 during payload periods and to couple test data to the transmitter 710 during test periods. It should be noted that transmitter-correction information is also coupled from the demodulator 714 to the error processor 814 on the signal line 816 in the same way as was discussed above with respect to FIG. 3. As discussed above, in some embodiments, the transmitter-correction information comprises measurements indicative of the amount of I/Q imbalance error and DC offset error present in the transmitter-check signal. In such embodiments, the error processor 814 calculates the values of transmitter-correction parameters to be applied to a transmitter-correction module 701 within the correction and output module 310. The transmitter-correction parameters are then coupled from the error processor 814 to the transmitter-correction module 701 over signal line 812. Alternatively, the transmitter-correction information comprises the transmitter-correction parameters (as discussed above). The transmitter-correction parameters are then coupled from the error processor 814 over the signal line 812 to the transmitter-correction module 701 to counteract the I/Q imbalance error, DC offset error, or both in the transmitter 710.

In some cases, it may be desirable to initialize the user terminal 300, 700, 800. For example, when a user terminal 300 first starts to transmit signals to and receive signals from the satellite 320, I/Q imbalance errors and DC offset errors that are present in the transmitter 304 and receiver 306 can create substantial distortion. Such distortion can result in a data error rate in either the receiver 306 in the user terminal 300 or the receiver 402 in the remote node 326 (or both) that makes it difficult or impossible to start the process of correcting the errors. Therefore, it may be desirable for the modulator 308 within the transmitter 304 and the modulator 418 in the remote node 326 to use a robust modulation. Initially using a robust modulation scheme reduces the possibility that the error rate at both the remote node receiver 402 and at the user terminal receiver 306 will be too great to begin the process of correcting any I/Q imbalance and/or DC offset errors.

Figure 9:
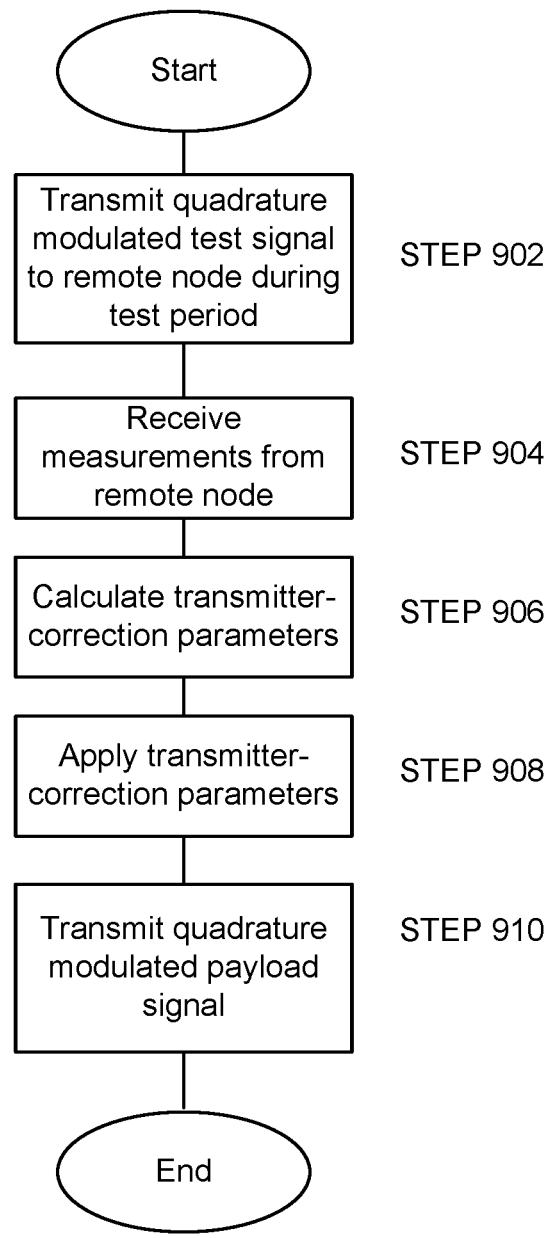
FIG. 9 is a flowchart of a method performed by a user terminal to counteract errors in a transmitter using a test signal transmitted during a test period.

FIG. 9 is a flowchart of an embodiment of a method performed by a user terminal (e.g., 300, 700, 800) to counteract errors in a transmitter of a user terminal using a test signal transmitted during a test period. In the embodiment shown in FIG. 9, a transmitter-check signal comprising at least a test signal is transmitted from the user terminal to the remote terminal 326 during a test period. At the end of the test period, payload information is transmitted by the user terminal to the remote terminal during a payload period.

The method begins with the transmission of the transmitter-check signal from a transmitter of a user terminal during a test period (STEP 902). In one embodiment, the transmitter-check signal is a quadrature modulated radio frequency (RF) signal comprising at least a test signal. The test signal has test data modulated thereon. That is, the test data provides the remote node with data from which the remote node can measure transmitter-error data indicating the amount of error (such as I/Q imbalance and/or DC offset errors) present in the transmitter-check signal received at the remote node. Those skilled in the art will appreciate that selecting particular modulation symbols can make it easier to measure such errors. The user terminal receives the transmitter-error data from the remote node (STEP 904). The measurements indicate the amount of I/Q imbalance error, DC offset error or both, that were present in the transmitter-check signal received by the remote node 326 from the user terminal.

The user terminal then calculates transmitter-correction parameters from the transmitter-error data (STEP 906). Alternatively, the transmitter-correction parameters can be calculated at the remote node and received at the user terminal at STEP 906. Regardless, the transmitter-correction parameters are then applied to the transmitter-correction module setting the transmitter-correction module to counteract I/Q imbalance and/or DC offset errors in payload signals thereafter processed in and transmitted from (STEP 910) the transmitter 304 to counteract the errors (STEP 908).

Figure 10:
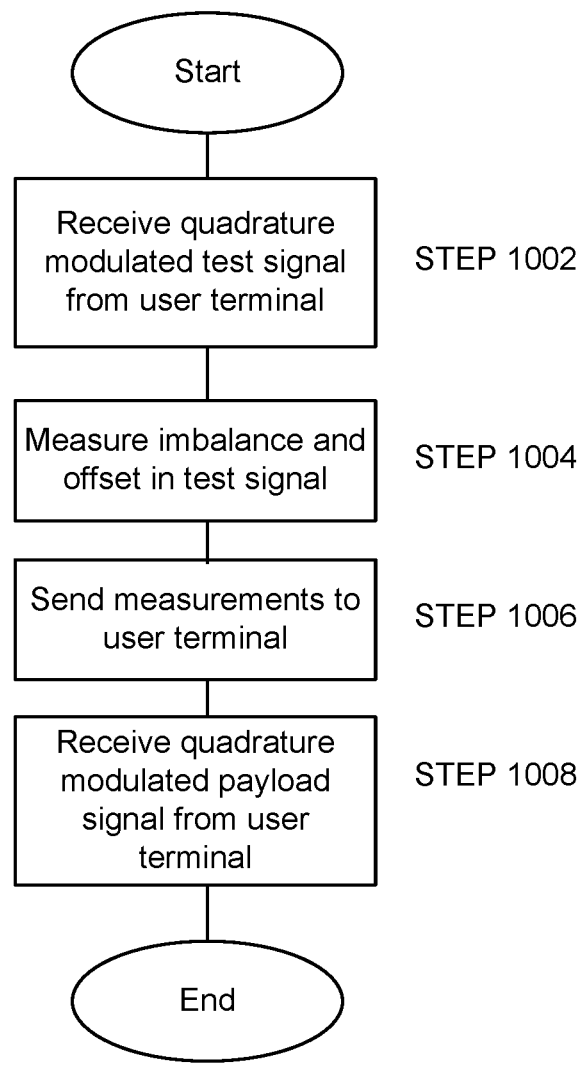
FIG. 10 is a flowchart of a method performed by a remote node to assist in the method of FIG. 9.

FIG. 10 is a flowchart of an embodiment of a method performed by a remote node (e.g., 326) to assist in the method of FIG. 9. The method begins by receiving within the remote node 326 the quadrature modulated transmitter-check signal sent by the user terminal at STEP 902 of FIG. 9 (STEP 1002). The transmitter-check signal is coupled to the input of the remote receiver 402 (see FIG. 4). The remote correction module 412 within the remote receiver 402 measures the I/Q imbalance error and/or DC offset error to generate transmitter-error data (STEP 1004). The transmitter-error data is coupled to the remote transmitter 404 through the remote error processor 414 and data selector 416 as discussed above with respect to FIG. 4. The transmitter-error data comprising the measurements are transmitted from the remote node to the user terminal (STEP 1006). Alternatively, the remote node can calculate transmitter-correction parameters following STEP 1004 and send the parameters to the user node in STEP 1006. Regardless, the remote node will then transition to payload mode during a payload period. During the payload period, the remote node will receive quadrature modulated payload signals from the user terminal sent as part of STEP 910 of FIG. 9 (STEP 1008).

Figure 11:
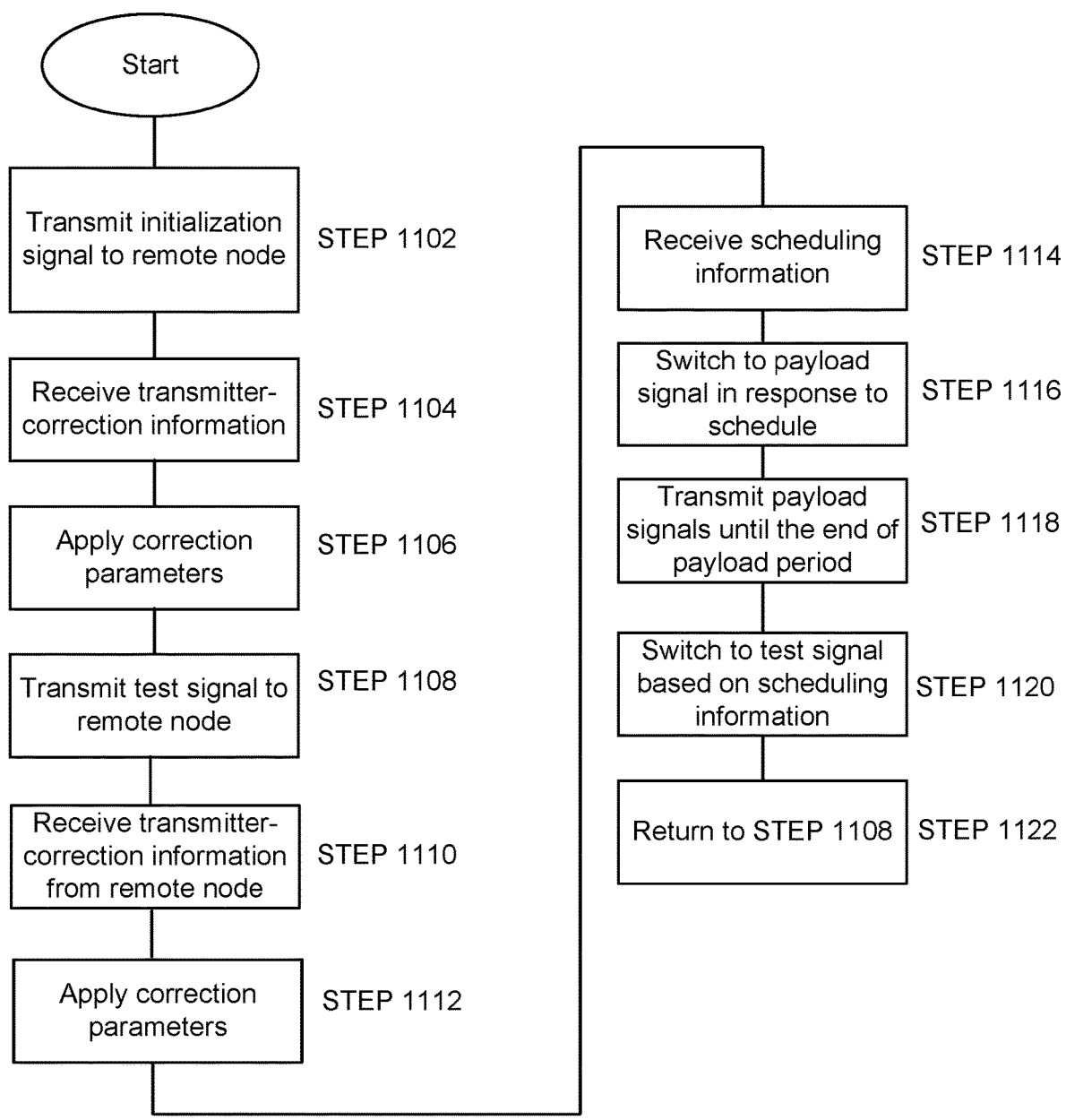
FIG. 11 is a flowchart of another method performed by a user terminal to counteract transmitter errors with initialization of the user terminal.

FIG. 11 is a flowchart of another method performed by a user terminal (e.g., 300, 700, 800) to counteract transmitter errors. The method begins by transmitting to the remote node 326 an initialization signal from the user terminal (STEP 1102). In one embodiment, the initialization signal comprises a test signal on which test data is modulated using a robust modulation scheme. As noted above, initially using a robust modulation scheme reduces the possibility that the error rate at both the remote node receiver and at the user terminal receiver will be too great to begin the process of correcting any I/Q imbalance error and DC offset errors. In an alternative embodiment, the initialization signal may include payload data that is modulated using a robust modulation scheme.

The user terminal then receives back from the remote node 326 transmitter-correction information. The transmitter-correction information can comprise transmitter-error data indicating the amount of error present in the initialization signal (STEP 1104), and the user terminal can calculate transmitter-correction parameters from the transmitter-error data. Alternatively, the transmitter-correction information can comprise transmitter-correction parameters calculated at the remote node. Regardless, the transmitter-correction parameters are applied to the transmitter-correction module 701 to counteract errors (e.g., I/Q imbalance errors and DC offset errors) in the transmitter (STEP 1106). Once the errors have been counteracted, a test period begins, during which the user terminal transmits to the remote node 326 a transmitter-check signal comprising a test signal (STEP 1108). The user terminal then receives back from the remote node 326 transmitter-correction information, which as noted can comprise transmitter-error data from or transmitter-correction parameters. (STEP 1110). If the transmitter-correction information comprises transmitter-error data, the user terminal calculates the transmitter-correction parameters from the transmitter-error data received. Regardless, the user terminal applies the transmitter-correction parameters to the transmitter-correction module 701 to counteract errors (e.g., I/Q imbalance errors and DC offset errors) in the transmitter (STEP 1112).

Alternating payload periods (STEPs 1116, 1118) and test periods (STEPS 1108 to 1112) can then occur in accordance with scheduling information received at the user terminal. For example, the user terminal receives scheduling information from the remote node 326 that indicates when test periods begin and end and when payload periods begin and end (STEP 1114). Based on the scheduling information, the user terminal begins transmitting payload signals (STEP 1116). The payload signals are transmitted through the end of the payload period (STEP 1118). At the end of the payload period and the beginning of the next test period, the user terminal switches to test mode (STEP 1120). The process then returns to STEP 1108 and repeats the steps between STEP 1108 and STEP 1120.

Figure 12:
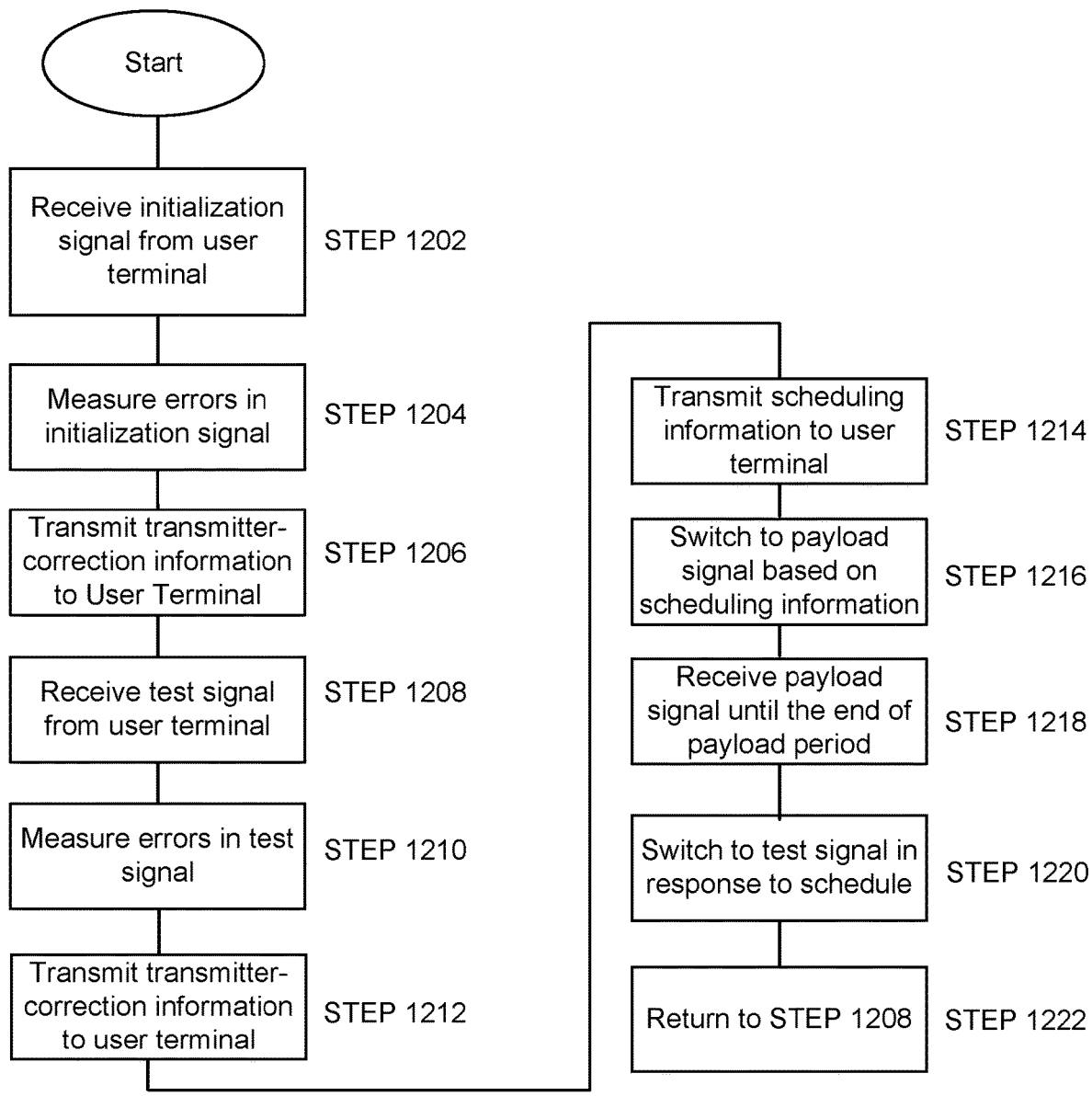
FIG. 12 is a flowchart of a method performed by a remote node to assist in the method of FIG. 11.

FIG. 12 is a flowchart of a method performed by a remote node 326 to assist in initializing and setting a user terminal to counteract IQ imbalance and/or DC offset errors. The method begins with the remote node 326 in an initialization mode. The remote node 326 receives an initialization signal from the user terminal (e.g., sent as part of step 1102 of FIG. 11) (STEP 1202). The remote node 326 generates transmitter-error data by measuring errors in the received initialization signal (STEP 1204). The remote node 326 then transmits transmitter-correction information (e.g., which is received at the user terminal as part of STEP 1104 of FIG. 11) (STEP 1206). In some embodiments, the transmitter-correction information comprises the transmitter-error data. In other embodiments, the transmitter-correction information comprises transmitter-correction parameters calculated within the remote node 326 from the transmitter-error data.

The remote node 326 will then transition from an initialization mode to a test mode. In test mode, the remote node 326 receives a transmitter-check signal sent by the user terminal (e.g., as part of STEP 1108 of FIG. 11) comprising test data (STEP 1208). The remote node generates transmitter-error data by measuring the I/Q imbalance error and/or DC offset error of the received transmitter-check signal (STEP 1210). The remote node transmits transmitter-correction information (STEP 1212), which is received by the user terminal as part of STEP 1110.

In some embodiments, the transmitter-correction information comprises the transmitter-error data. In other embodiments, the transmitter-correction information comprises transmitter-correction parameters calculated within the remote node 326 from the transmitter-error data. In addition, the remote node 326 transmits the scheduling information to the user terminal (STEP 1214), which is received at the user terminal as part of STEP 1114 in FIG. 11. When indicated by the scheduling information, the remote node 326 transitions to payload mode in which the remote node 326 receives payload signals sent by the user terminal as part of STEP 1118 of FIG. 11 (STEP 1216). The remote node continues to receive payload information until the end of the payload period, as indicated by the scheduling information (STEP 1218).

The remote node 326 then transitions to test mode, as indicated by the scheduling information (STEPs 1220, 1222). The method thus returns to STEP 1208, and the remote node 326 once again receives a transmitter-check signal. The method then repeats STEP 1210 through STEP 1222.

Figure 13:
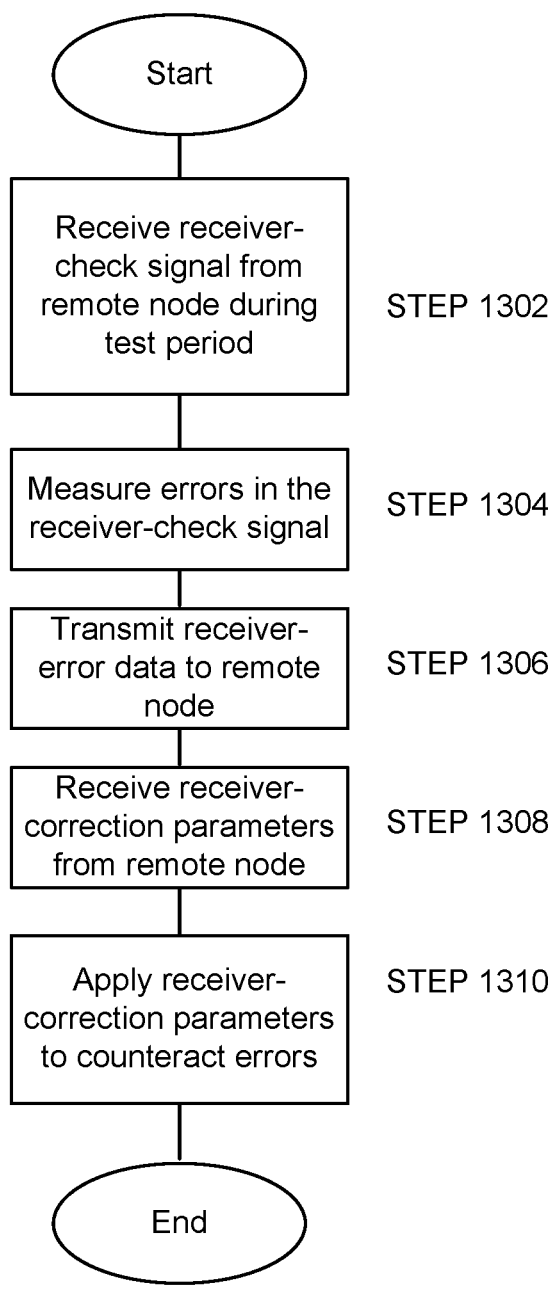
FIG. 13 is a flowchart of a method performed by a remote node to counteract receiver errors in the user terminal, wherein parameters are calculated in the remote node based on signals transmitted to the user terminal from the remote terminal during a test period.

FIG. 13 is a flowchart of a method performed by a user terminal (e.g., 300, 700, 800) to counteract receiver errors in the user terminal, wherein parameters are calculated in the remote node based on signals transmitted to the user terminal from the remote terminal during a test period. The user terminal receives a receiver-check signal from the remote node (STEP 1302). In some embodiments, the receiver-check signal comprises a test signal comprising test data. Alternatively, the receiver-check signal comprises payload data. The user terminal measures errors (e.g., I/Q imbalance and/or DC offset errors) in the received receiver-check signal and generates receiver-error data indicating the amount of error present in the receiver-check signal (STEP 1304). The receiver-error data is transmitted to the remote node 326 (STEP 1306). The user terminal then receives receiver-correction parameters that were calculated in the remote node from the receiver-error data (STEP 1308). The user terminal then applies the receiver-correction parameters to counteract the errors in the receiver of the user terminal (STEP 1310). In one embodiment, the receiver-check signal is transmitted during a receiver-test period. The receiver-test period may be different from the test period during which the user terminal transmits the transmitter-check signal. At the end of the receiver-test period, a receiver-payload period begins during which the user terminal receives payload signals from the remote node 326. In one embodiment, the remote node 326 transmits scheduling information to the user terminal that indicates when the receiver-test period begins and ends and when the receiver-payload period begins and ends. Such scheduling information may be sent together with scheduling information that indicates the schedule for receiving transmitter-check signals.

Although the disclosed method and apparatus is described above in terms of various example cases, embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided above.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more," or the like.

A group of items linked with the conjunction "and" should not be read as requiring that each and every one of those items be present in the grouping, but rather should be read as including all or any subset of all unless expressly stated otherwise. Similarly, a group of items linked with the conjunction "or" should not be read as requiring mutual exclusivity among that group, but rather should also be read as including all or any subset of all unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," or other like phrases in some instances shall not be read to mean that the narrower case is intended or required in instances where such broadening phrases may be absent.

Additionally, the various embodiments set forth herein are described with the aid of block diagrams and other illustrations. It is to be understood that the illustrated embodiments and their various alternatives may be implemented without confinement to the illustrated examples. For example, block diagrams and their accompanying description should not be construed as mandating a particular architecture or configuration.

What is claimed is:

1. A method for reducing signal distortion in a user terminal, the method comprising:
   transmitting a quadrature modulated transmitter-check signal from the user terminal over a communications network to a remote node;
   receiving, from the remote node over the communications network at the user terminal, transmitter-correction information corresponding to at least one of an in-phase/quadrature (I/Q) imbalance error and a direct current (DC) offset error measured in the transmitter-check signal;
   utilizing the transmitter-correction information to set a transmitter-correction module in the user terminal to counteract the at least one of the I/Q imbalance error and the DC offset error;
   receiving, from the remote node over the communications network at the user terminal, scheduling information; and
   using the scheduling information to determine when the quadrature modulated transmitter-check signal is scheduled to be transmitted and when payload signals are scheduled to be transmitted,
   wherein the transmitting the quadrature modulated transmitter-check signal includes transmitting the quadrature modulated transmitter-check signal during a test period and transmitting a payload signal during a payload period.

2. The method of claim 1, wherein the communications network includes a satellite link between the user terminal and the remote node.

3. The method of claim 1, wherein:
   the transmitter-correction information includes the at least one of the I/Q imbalance error and the DC offset error; and
   the utilizing comprises:
      calculating, at the user terminal, transmitter-correction parameters from the at least one of the I/Q imbalance error and the DC offset error; and
      applying the transmitter-correction parameters to the transmitter-correction module, wherein the transmitter-correction parameters set the transmitter-correction module to counteract the at least one of the I/Q imbalance error and the DC offset error in the user terminal.

4. The method of claim 1, wherein:
   the received transmitter-correction information includes transmitter-correction parameters for setting the transmitter-correction module to counteract the at least one of the I/Q imbalance error and the DC offset error in the user terminal; and
   the utilizing comprises applying the transmitter-correction parameters to the transmitter-correction module.

5. The method of claim 1, wherein the transmitter-check signal comprises a modulated signal carrying payload information.

6. The method of claim 1, wherein the transmitter-check signal comprises a test signal.

7. The method of claim 1, wherein the remote node is a satellite system gateway.

8. The method of claim 1, wherein the transmitter-correction information is utilized to counteract errors during both transmission of transmitter-check signal and the payload signal.

9. The method of claim 1, further comprising controlling a transmit data switch to selectively transmit the quadrature modulated transmitter-check signal or the payload signal.

10. The method of claim 1 further comprising:
receiving a quadrature modulated receiver-check signal at the user terminal over the communications network from the remote node;
measuring at the user terminal at least one of an I/Q imbalance error and a DC offset error in the receiver-check signal; and
applying receiver-correction parameters calculated from the at least one of an I/Q imbalance error and a DC offset error in the receiver-check signal to a receiver-correction module in the user terminal, wherein the receiver-correction parameters set the receiver-correction module to counteract the at least one of an I/Q imbalance error and a DC offset error in the receiver-check signal.

11. The method of claim 10 further comprising calculating the receiver-correction parameters at the user terminal.

12. The method of claim 11 further comprising:
sending the at least one of an I/Q imbalance error and a DC offset error in the receiver-check signal from the user terminal across the communications network to the remote node; and
thereafter receiving the receiver-correction parameters at the user terminal across the communications network from the remote node.

13. The method of claim 11, wherein the receiver-check signal comprises a modulated signal carrying payload information.

14. The method of claim 11, wherein the receiver-check signal comprises a test signal.

15. A user terminal comprising:
a transmitter configured to transmit a quadrature modulated transmitter-check signal over a communications network to a remote node;
a receiver configured to receive from the remote node over the communication network transmitter-correction information corresponding to at least one of an in-phase/quadrature (I/Q) imbalance error and a direct current (DC) offset error measured in the transmitter-check signal at the remote node; and
a transmitter-correction module configured to counteract the at least one of an I/Q imbalance error and a DC offset error at the user terminal when set with transmitter-correction parameters calculated from the at least one of an I/Q imbalance error and a DC offset error;
a transmit data switch having a control input and configured to receive payload data and test data; and
a terminal core processor coupled to the control input of the transmit data switch, the terminal core processor configured to control the transmit data switch to couple the test data to the transmitter during a test period and payload data during a payload period,
wherein the transmitter-correction information further includes scheduling information indicating when the test periods occur and when the payload periods occur.

16. The user terminal of claim 15, wherein the transmitter and receiver are configured to transmit and receive signals in a satellite communications system.

17. The user terminal of claim 15, wherein the transmitter-correction information comprises the transmitter-correction parameters.

18. The user terminal of claim 15, wherein:
the transmitter-correction information comprises the at least one of the I/Q imbalance error and the DC offset error, and
the user terminal further comprises an error processor configured to calculate the transmitter-correction parameters from the at least one of the I/Q imbalance error and the DC offset error.

19. The user terminal of claim 15, wherein the transmitter-check signal comprises a modulated signal carrying payload information.

20. The user terminal of claim 15, wherein the transmitter-check signal comprises a test signal.

21. The user terminal of claim 15, wherein the remote node is a satellite communications system gateway.

22. The user terminal of claim 15, wherein the transmitter-correction information is used to counteract errors during both test periods and payload periods.

23. The user terminal of claim 15, wherein:
the receiver is further configured to receive a quadrature modulated receiver-check signal, and
the user terminal further comprises a receiver-correction module configured to measure within the user terminal at least one of an I/Q imbalance error and a DC offset error in the receiver-check signal.

24. The user terminal of claim 23 further comprising:
an error processor configured to calculate receiver-correction parameters from the at least one of the I/Q imbalance error and the DC offset error,
wherein the receiver-correction module is further configured to use the receiver-correction parameters to counteract the at least one of the I/Q imbalance error and the DC offset error in the receiver-check signal.

25. The user terminal of claim 23, further comprising a transmit data switch configured to receive control signals and the at least one of the I/Q imbalance error and the DC offset error and selectively couple the at least one of the I/Q imbalance error and the DC offset error to the transmitter.

26. The user terminal of claim 25, wherein:
the receiver is further configured to receive from the remote node receiver-correction parameters calculated from the at least one of the I/Q imbalance error and the DC offset error, and
the receiver-correction module is further configured to use the receiver-correction parameters to counteract the at least one of the I/Q imbalance error and the DC offset error in the receiver-check signal.

27. The user terminal of claim 25, wherein the receiver-check signal comprises a test signal.

* * * * *